US012463671B2

(12) United States Patent
Suzuki et al.

(10) Patent No.: US 12,463,671 B2
(45) Date of Patent: Nov. 4, 2025

(54) RADIO FREQUENCY MODULE AND COMMUNICATION DEVICE

(71) Applicant: Murata Manufacturing Co., Ltd., Kyoto (JP)

(72) Inventors: Yuusuke Suzuki, Kyoto (JP); Takanori Uejima, Kyoto (JP); Masanari Miura, Kyoto (JP); Jun Takahara, Kyoto (JP); Naoya Matsumoto, Kyoto (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 384 days.

(21) Appl. No.: 18/154,947

(22) Filed: Jan. 16, 2023

(65) Prior Publication Data

US 2023/0155612 A1 May 18, 2023

Related U.S. Application Data

(63) Continuation of application No. PCT/JP2021/024660, filed on Jun. 30, 2021.

(30) Foreign Application Priority Data

Jul. 28, 2020 (JP) ................................. 2020-127779

(51) Int. Cl.
*H04B 1/04* (2006.01)
*H04B 1/18* (2006.01)

(52) U.S. Cl.
CPC ................ *H04B 1/04* (2013.01); *H04B 1/18* (2013.01); *H04B 2001/0408* (2013.01)

(58) Field of Classification Search
CPC .... H04B 1/04; H04B 1/18; H04B 2001/0408; H04B 1/0057; H04B 1/00; H04B 1/006;
(Continued)

(56) References Cited

U.S. PATENT DOCUMENTS 10,056,922 B1 * 8/2018 Tsvelykh ................. H01P 1/20
2015/0373711 A1 12/2015 Narathong et al.
(Continued)

FOREIGN PATENT DOCUMENTS

CN 110635779 A 12/2019
CN 111384995 A 7/2020
(Continued)

OTHER PUBLICATIONS

International Search Report for PCT/JP2021/024660 dated Sep. 21, 2021.

*Primary Examiner* — Kenneth T Lam
(74) *Attorney, Agent, or Firm* — McDonald Hopkins LLC

(57) ABSTRACT

A radio frequency module includes: a radio frequency input terminal for receiving an amplified transmission signal from the outside; radio frequency output terminals for supplying a reception signal to the outside; a filter connected between the radio frequency input terminal/the radio frequency output terminal and an antenna connection terminal, and having a passband including communication band D for TDD; and a filter connected between the radio frequency output terminal and the antenna connection terminal and having a passband including at least part of communication band A allowed for simultaneous communication with communication band D. The radio frequency input terminal is arranged in a region extending along a side of the module substrate, and the radio frequency output terminal is arranged in a region extending along a side facing the side of the module substrate.

20 Claims, 4 Drawing Sheets

(58) Field of Classification Search
CPC ... H04B 1/38; H04B 1/44; H04B 1/50; H04B 1/54; H05K 1/03
See application file for complete search history.

(56) References Cited

U.S. PATENT DOCUMENTS

| | | | |
|---|---|---|---|
| 2016/0006556 A1* | 1/2016 | Pehlke | H04B 1/0057 370/280 |
| 2016/0197643 A1* | 7/2016 | Uejima | H04B 1/40 455/73 |
| 2018/0091187 A1 | 3/2018 | Uejima | |
| 2019/0140669 A1* | 5/2019 | Aikawa | H04B 1/16 |
| 2019/0238169 A1 | 8/2019 | Naniwa et al. | |
| 2019/0273519 A1* | 9/2019 | Shinozaki | H04B 1/48 |
| 2019/0326938 A1 | 10/2019 | Horita | |
| 2020/0007096 A1* | 1/2020 | Kita | H03H 7/46 |
| 2020/0007174 A1 | 1/2020 | Watanabe | |
| 2020/0014429 A1 | 1/2020 | Leung | |
| 2020/0051942 A1* | 2/2020 | Nakazawa | H04B 1/006 |
| 2020/0203291 A1* | 6/2020 | Uejima | H01L 25/16 |
| 2020/0228073 A1 | 7/2020 | Naniwa | |
| 2020/0228151 A1 | 7/2020 | Naniwa et al. | |
| 2020/0395972 A1 | 12/2020 | Matsumoto | |
| 2021/0151397 A1 | 5/2021 | Naniwa et al. | |
| 2021/0159133 A1 | 5/2021 | Aikawa et al. | |

FOREIGN PATENT DOCUMENTS

| | | |
|---|---|---|
| JP | 2009-219023 A | 9/2009 |
| JP | 2017-527155 A | 9/2017 |
| JP | 2019-068194 A | 4/2019 |
| JP | 2019-154025 A | 9/2019 |
| JP | 2019-192992 A | 10/2019 |
| WO | 2015/041125 A1 | 3/2015 |
| WO | 2016/194924 A1 | 12/2016 |
| WO | 2018/088410 A1 | 5/2018 |
| WO | 2018/168653 A1 | 9/2018 |
| WO | 2019/065311 A1 | 4/2019 |
| WO | 2019/065419 A1 | 4/2019 |
| WO | 2019/188968 A1 | 10/2019 |
| WO | 2020/066380 A1 | 4/2020 |
| WO | 2020/071021 A1 | 4/2020 |

* cited by examiner

RADIO FREQUENCY MODULE AND COMMUNICATION DEVICE

CROSS REFERENCE TO RELATED APPLICATION

This is a continuation of International Application No. PCT/JP2021/024660 filed on Jun. 30, 2021 which claims priority from Japanese Patent Application No. 2020-127779 filed on Jul. 28, 2020. The contents of these applications are incorporated herein by reference in their entireties.

BACKGROUND ART

Technical Field

The present disclosure relates to a radio frequency (RF) module and a communication device.

In recent mobile phones, in addition to making one terminal capable of supporting multiple modes and multiple communication bands corresponding to multiple communication systems, it is also suitable for one terminal to be able to perform simultaneous communication with multiple communication systems and/or in multiple communication bands. For example, Patent Document 1 discloses a diversity module for transmitting an uplink signal from a diversity antenna.

Patent Document 1: Japanese Unexamined Patent Application Publication (Translation of PCT Application) No. 2017-527155

BRIEF SUMMARY

However, in the above-described background art, when simultaneous communication is performed in multiple communication bands, a transmission signal and a reception signal may interfere with each other, causing a decrease in reception sensitivity.

Therefore, the present disclosure provides a radio frequency module and a communication device capable of suppressing the interference between a transmission signal and a reception signal in the case where simultaneous communication is performed in multiple communication bands.

A radio frequency module according to an aspect of the present disclosure includes: a module substrate having a first main surface and a second main surface facing each other and having an outline that is rectangular in plan view; a plurality of external connection terminals arranged on the second main surface and including a radio frequency input terminal for receiving an amplified transmission signal from outside, a first radio frequency output terminal and a second radio frequency output terminal for supplying a reception signal to outside, and an antenna connection terminal; a first filter arranged on the first main surface, connected between the radio frequency input terminal/the first radio frequency output terminal and the antenna connection terminal, and having a passband including a first communication band for time division duplex (TDD); and a second filter arranged on the first main surface, connected between the second radio frequency output terminal and the antenna connection terminal, and having a passband including at least part of a second communication band allowed for simultaneous communication with the first communication band; wherein the radio frequency input terminal is arranged in a first region on the second main surface, extending along a first side among four sides forming the rectangular outline of the module substrate, and the second radio frequency output terminal is arranged in a second region on the second main surface, extending along a second side facing the first side, among the four sides forming the rectangular outline of the module substrate.

According to the present disclosure, the interference between a transmission signal and a reception signal can be suppressed in the case where simultaneous communication is performed in multiple communication bands.

DETAILED DESCRIPTION

Hereinafter, an embodiment of the present disclosure will be described in detail using the drawings. Note that the embodiment described below indicates comprehensive or specific examples. Numerical values, shapes, materials, elements, the arrangement and connection forms of elements, and the like discussed in the following embodiment are examples and are not intended to limit the present disclosure.

Note that each drawing is a schematic diagram in which an emphasis, omission, or ratio adjustment is performed as appropriate to indicate the present disclosure. Each drawing is not necessarily strictly illustrated, and may differ from the actual shapes, positional relationships, and ratios. In each drawing, substantially the same configurations are denoted by the same reference sign, and duplicate descriptions may be omitted or simplified.

In each drawing hereinafter, the x-axis and the y-axis are axes perpendicular to each other on a plane parallel to a main surface of a module substrate. The z-axis is an axis perpendicular to the main surface of the module substrate, and the positive direction thereof indicates the upward direction and the negative direction indicates the downward direction.

Moreover, in the circuit configuration of the present disclosure, "connected" includes not only cases of being directly connected by a connection terminal and/or a wiring conductor, but also cases of being electrically connected with another circuit element interposed therebetween. Also, "connected between A and B" means being connected to both A and B between A and B.

Furthermore, in the module configuration of the present disclosure, "in plan view" means viewing an object by orthographic projection from the z-axis positive side to the xy plane. "A component is arranged on a main surface of a substrate" includes, in addition to the component being arranged on the main surface while being in contact with the main surface of the substrate, the component being arranged above the main surface without necessarily being in contact with the main surface and the component being arranged by being partially embedded in the substrate from the main surface side. "A is arranged between B and C" means that at least one of line segments connecting any point within B and any point within C passes through A. In addition, terms indicating relationships between elements, such as "parallel" and "perpendicular", and terms indicating the shapes of elements, such as "rectangular", do not represent only the strict meanings, but also include substantially equivalent ranges, such as including an error of about several percent.

EMBODIMENT

[1.1 Circuit Configuration of Radio Frequency Module 1 and Communication Device 5]

Figure 1:
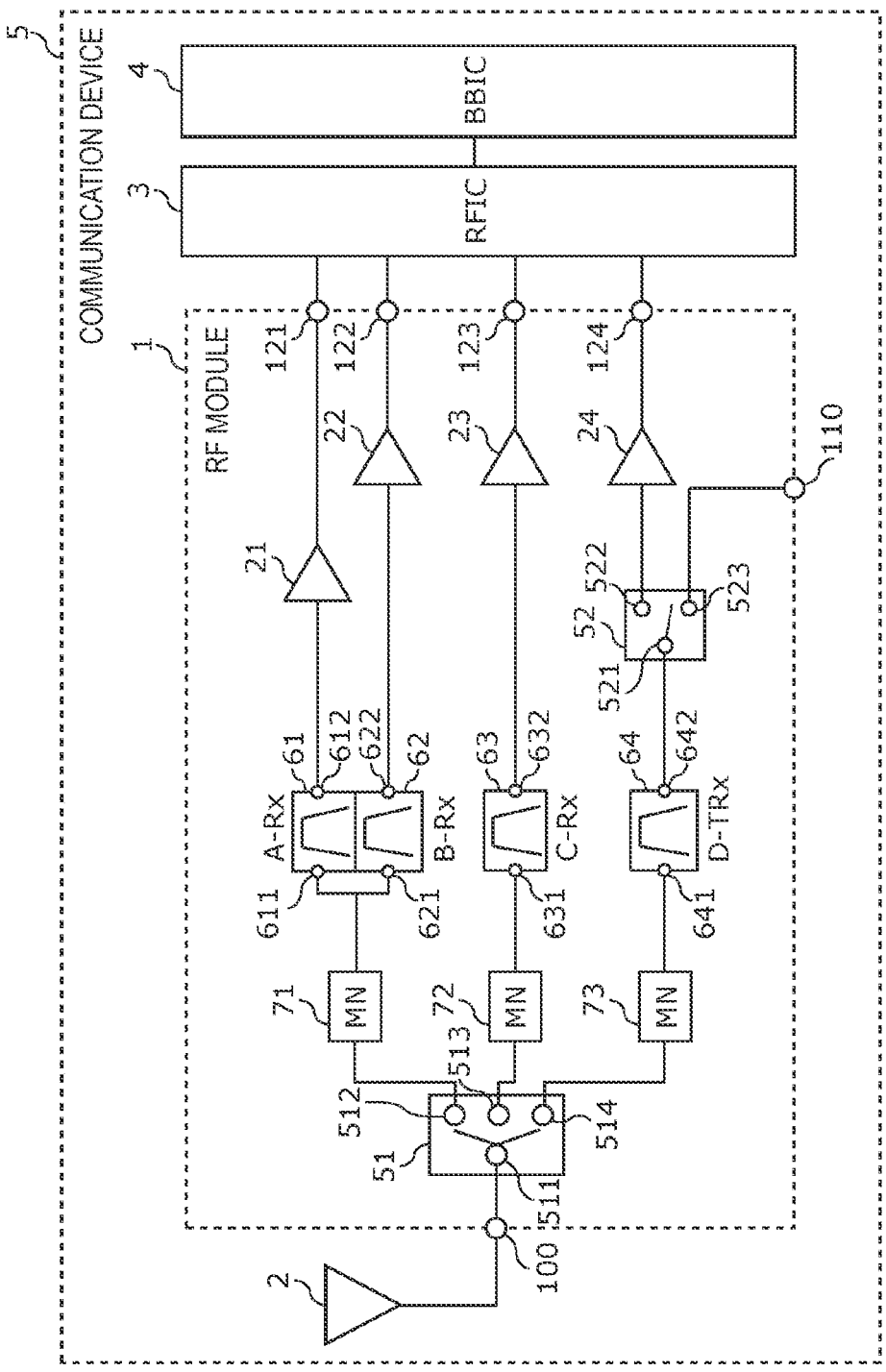
FIG. 1 is a circuit diagram of a radio frequency (RF) module and a communication device according to an embodiment.

The circuit configuration of a radio frequency (RF) module 1 and a communication device 5 according to the present embodiment will be described with reference to FIG. 1. FIG. 1 is a circuit configuration diagram of the RF module 1 and the communication device 5 according to a first embodiment.

[1.1.1 Circuit Configuration of Communication Device 5]

Firstly, the circuit configuration of the communication device 5 will be described. As illustrated in FIG. 1, the communication device 5 according to the present embodiment includes the RF module 1, an antenna 2, an RFIC 3, and a BBIC 4.

The RF module 1 transmits an RF signal between the antenna 2 and the RFIC 3. The RF module 1 can be used as a diversity module capable of transmitting RF signals for TDD in addition to receiving RF signals for TDD and frequency division duplex (FDD). The detailed circuit configuration of the RF module 1 will be described later.

The antenna 2 is connected to an antenna connection terminal 100 of the RF module 1. The antenna 2 transmits an RF signal output from the RF module 1, and also receives an RF signal from the outside and outputs it to the RF module 1.

The RFIC 3 is an example of a signal processing circuit that processes an RF signal. Specifically, the RFIC 3 applies signal processing, such as downconverting, to an RF reception signal input through a reception path of the RF module 1, and outputs a reception signal generated by the signal processing to the BBIC 4. In addition, the RFIC 3 applies signal processing, such as upconverting, to a transmission signal input from the BBIC 4, and outputs an RF transmission signal generated by the signal processing to a transmission path of the RF module 1 by way of an amplifier circuit or the like. Moreover, the RFIC 3 has a controller that controls switches and amplifiers included in the RF module 1. Note that some or all of the functions as the controller of the RFIC 3 may be mounted outside the RFIC 3, such as on the BBIC 4 or the RF module 1.

The BBIC 4 is a baseband signal processing circuit that applies signal processing using an intermediate frequency band lower than RF signals transmitted by the RF module 1. As signals processed by the BBIC 4, for example, an image signal for displaying an image and/or an audio signal for conversation using a loudspeaker is used.

Note that the antenna 2 and the BBIC 4 are optional elements of the communication device 5 according to the present embodiment.

[1.1.2 Circuit Configuration of RF Module 1]

Next, the circuit configuration of the RF module 1 will be described. As illustrated in FIG. 1, the RF module 1 includes low noise amplifiers 21 to 24, switches 51 and 52, filters 61 to 64, matching circuits (MN) 71 to 73, the antenna connection terminal 100, an RF input terminal 110, and RF output terminals 121 to 124.

The antenna connection terminal 100 is connected to the antenna 2.

The RF input terminal 110 is a terminal for receiving an amplified RF transmission signal from the outside of the RF module 1. Specifically, the RF input terminal 110 is a terminal for receiving a transmission signal that is in communication band D for TDD and that has been amplified by an external power amplifier circuit.

Here, communication bands mean frequency bands defined in advance by standardization organizations for communication systems (such as 3GPP (3rd Generation Partnership Project) and IEEE (Institute of Electrical and Electronics Engineers)). The communication systems mean communication systems configured using radio access technology (RAT). As the communication systems, for example, 5GNR (5th Generation New Radio) systems, LTE (Long Term Evolution) systems, and WLAN (Wireless Local Area Network) systems can be used, but these are not the only possible types of communication systems.

The RF output terminals 121 to 124 are terminals for providing an RF reception signal to the outside of the RF module 1. Specifically, the RF output terminal 121 is an example of a second RF output terminal, and is a terminal for supplying a reception signal in communication band A to the RFIC 3. The RF output terminal 122 is an example of the second RF output terminal, and is a terminal for supplying a reception signal in communication band B to the RFIC 3. The RF output terminal 123 is an example of a third RF output terminal, and is a terminal for supplying a reception signal in communication band C to the RFIC 3. The RF output terminal 124 is an example of a first RF output terminal, and is a terminal for supplying a reception signal in communication band D to the RFIC 3.

Each of communication bands A and B is an example of a second communication band, and is allowed for simultaneous communication with communication band D. As a combination of communication bands A and B, the combination of Band 1 and Band 3 for LTE can be used, but this is not the only possible combination. For example, as a combination of communication bands A and B, any two of Band 1 and Band 3 for LTE and n75 and n76 for 5GNR may be used. Alternatively, for example, as a combination of communication bands A and B, Band 25 and Band 66 for LTE may be used. Alternatively, for example, frequency bands for WLAN may be used as communication bands A and/or B. Alternatively, for example, a millimeter wave band of 7 GHz or more may be used as communication bands A and/or B.

Communication band C is an example of a third communication band, and does not allow for simultaneous communication with communication band D. As communication band C, Band 40 for LTE may be used, but this is not the only possible type of communication band. For example, Band 7 for LTE may be used as communication band C. Alternatively, for example, a frequency band for 5GNR or WLAN may be used as communication band C. Alternatively, for example, a millimeter wave band of 7 GHz or more may be used as communication band C.

Communication band D is an example of a first communication band, and is a communication band for TDD. As communication band D, Band 41 for LTE and/or n41 for 5GNR may be used, but this is not the only possible type of communication band. For example, a frequency band for WLAN may be used as communication band D. Alternatively, for example, a millimeter wave band of 7 GHz or more may be used as communication band D.

Note that multiple communication bands allowed for simultaneous communication means that at least one of simultaneous transmission, simultaneous reception, and simultaneous transmission/reception is allowed in multiple communication bands. At this time, each of multiple communication bands being used independently is not excluded. Combinations of communication bands allowed for simultaneous communication are defined in advance by, for example, standardization organizations for communication systems.

In addition, multiple communication bands not allowed for simultaneous communication means that none of simultaneous transmission, simultaneous reception, and simultaneous transmission/reception is allowed in multiple communication bands. Combinations of communication bands not allowed for simultaneous communication are combinations of communication bands excluding combinations of communication bands allowed for simultaneous communication.

The low noise amplifier 21 is connected between the filter 61 and the RF output terminal 121. The low noise amplifier 21 can amplify a reception signal in communication band A that has been input from the antenna connection terminal 100 by way of the switch 51, the matching circuit 71, and the filter 61. The reception signal in communication band A that has been amplified by the low noise amplifier 21 is output to the RF output terminal 121.

The low noise amplifier 22 is connected between the filter 62 and the RF output terminal 122. The low noise amplifier 22 can amplify a reception signal in communication band B that has been input from the antenna connection terminal 100 by way of the switch 51, the matching circuit 71, and the filter 62. The reception signal in communication band B that has been amplified by the low noise amplifier 22 is output to the RF output terminal 122.

The low noise amplifier 23 is connected between the filter 63 and the RF output terminal 123. The low noise amplifier 23 can amplify a reception signal in communication band C that has been input from the antenna connection terminal 100 by way of the switch 51, the matching circuit 72, and the filter 63. The reception signal in communication band C that has been amplified by the low noise amplifier 23 is output to the RF output terminal 123.

The low noise amplifier 24 is connected between the filter 64 and the RF output terminal 124. The low noise amplifier 24 can amplify a reception signal in communication band D that has been input from the antenna connection terminal 100 by way of the switch 51, the matching circuit 73, the filter 64, and the switch 52. The reception signal in communication band D that has been amplified by the low noise amplifier 24 is output to the RF output terminal 124.

The filter 61 (A-Rx) is an example of a second filter, and has a passband including the downlink operation band of communication band A. Accordingly, the filter 61 can pass a reception signal in communication band A and attenuate a transmission signal in communication band A, and a transmission signal and a reception signal in other communication bands not overlapping with communication band A.

The filter 61 has an input terminal 611 and an output terminal 612. The input terminal 611 is connected to the antenna connection terminal 100 with the matching circuit 71 and the switch 51 interposed therebetween. The output terminal 612 is connected to the input of the low noise amplifier 21.

The filter 62 (B-Rx) is an example of the second filter, and has a passband including the downlink operation band of communication band B. Accordingly, the filter 62 can pass a reception signal in communication band B and attenuate a transmission signal in communication band B, and a transmission signal and a reception signal in other communication bands not overlapping with communication band B.

The filter 62 has an input terminal 621 and an output terminal 622. The input terminal 621 is connected to the antenna connection terminal 100 with the matching circuit 71 and the switch 51 interposed therebetween. The output terminal 622 is connected to the input of the low noise amplifier 22.

The filters 61 and 62 form a multiplexer. That is, the filters 61 and 62 are bundled into one and connected to one terminal of the switch 51.

The filter 63 (C-Rx) is an example of a third filter, and has a passband including the downlink operation band of communication band C. Accordingly, the filter 63 can pass a reception signal in communication band C and attenuate a transmission signal in communication band C, and a transmission signal and a reception signal in other communication bands not overlapping with communication band C.

The filter 63 has an input terminal 631 and an output terminal 632. The input terminal 631 is connected to the antenna connection terminal 100 with the matching circuit 72 and the switch 51 interposed therebetween. The output terminal 632 is connected to the input of the low noise amplifier 23.

The filter 64 (D-TRx) is an example of a first filter, and has a passband including communication band D. Accordingly, the filter 64 can pass a transmission signal and a reception signal in communication band D and attenuate a transmission signal and a reception signal in other communication bands not overlapping with communication band D.

The filter 64 has two input/output terminals 641 and 642. The input/output terminal 641 is connected to the antenna connection terminal 100 with the matching circuit 73 and the switch 51 interposed therebetween. The input/output terminal 642 is connected to the input of the low noise amplifier 24 or the RF input terminal 110 with the switch 52 interposed therebetween.

The switch 51 is connected between the antenna connection terminal 100 and the filters 61 to 64. Specifically, the switch 51 has terminals 511 to 514. The terminal 511 is connected to the antenna connection terminal 100. The terminal 512 is connected to the filters 61 and 62 with the matching circuit 71 interposed therebetween. The terminal 513 is connected to the filter 63 with the matching circuit 72 interposed therebetween. The terminal 514 is connected to the filter 64 with the matching circuit 73 interposed therebetween.

In this connection configuration, the switch 51 can connect the terminal 511 to at least one of the terminals 512 to 514 based on, for example, a control signal from the RFIC 3. That is, the switch 51 can switch connection and non-connection between the antenna 2 and each of the filters 61 to 64. The switch 51 is formed of, for example, a multi-connection switch circuit, and may be called an antenna switch.

The switch 52 is connected between the filter 64 and the RF input terminal 110/the low noise amplifier 24. Specifically, the switch 52 has terminals 521 to 523. The terminal 521 is connected to the input/output terminal 642 of the filter 64. The terminal 522 is connected to the input of the low noise amplifier 24, and the terminal 523 is connected to the RF input terminal 110.

In this connection configuration, the switch 52 can connect the terminal 521 to either the terminal 522 or 523 based on, for example, a control signal from the RFIC 3. That is, the switch 52 can switch between connection of the filter 64 and the low noise amplifier 24 and connection of the filter 64 and the RF input terminal 110. The switch 52 is formed of, for example, an SPDT (Single Pole Double Throw) type switch circuit, and may be called a TDD switch.

The matching circuit 71 is formed of, for example, an inductor and/or a capacitor, and can perform impedance matching between the antenna 2 and the filters 61 and 62. The matching circuit 71 is connected between the switch 51 and the filters 61 and 62. Specifically, the matching circuit 71 is connected to both the input terminal 611 of the filter 61 and the input terminal 621 of the filter 62, and is connected to the antenna connection terminal 100 with the switch 51 interposed therebetween.

The matching circuit 72 is formed of, for example, an inductor and/or a capacitor, and can perform impedance matching between the antenna 2 and the filter 63. The matching circuit 72 is connected between the switch 51 and the filter 63. Specifically, the matching circuit 72 is connected to the input terminal 631 of the filter 63, and is connected to the antenna connection terminal 100 with the switch 51 interposed therebetween.

The matching circuit 73 is formed of, for example, an inductor and/or a capacitor, and can perform impedance matching between the antenna 2 and the filter 64. The matching circuit 73 is connected between the switch 51 and the filter 64. Specifically, the matching circuit 73 is connected to the input/output terminal 641 of the filter 64, and is connected to the antenna connection terminal 100 with the switch 51 interposed therebetween.

Note that some of the circuit elements illustrated in FIG. 1 need not be included in the RF module 1. For example, the RF module 1 only needs to include at least the filter 61 or 62, and the filter 64, and need not include other circuit elements.

[1.2 Arrangement of Components of RF Module 1]

Next, the arrangement of components of the RF module 1 formed as above will be specifically described with reference to FIGS. 2A to 4.

Figure 2A:
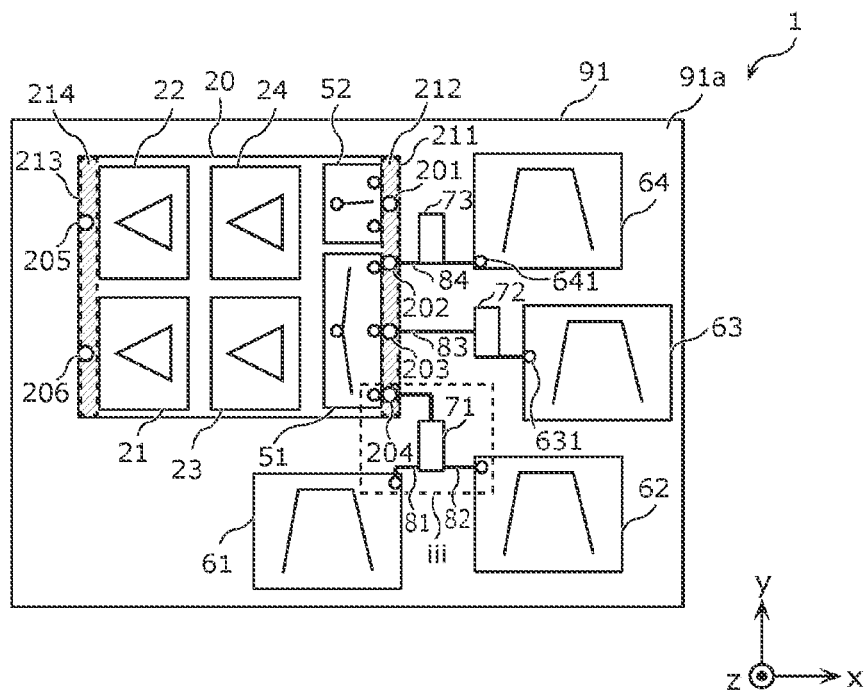
FIG. 2A is a plan view of the RF module according to the embodiment.
Figure 2B:
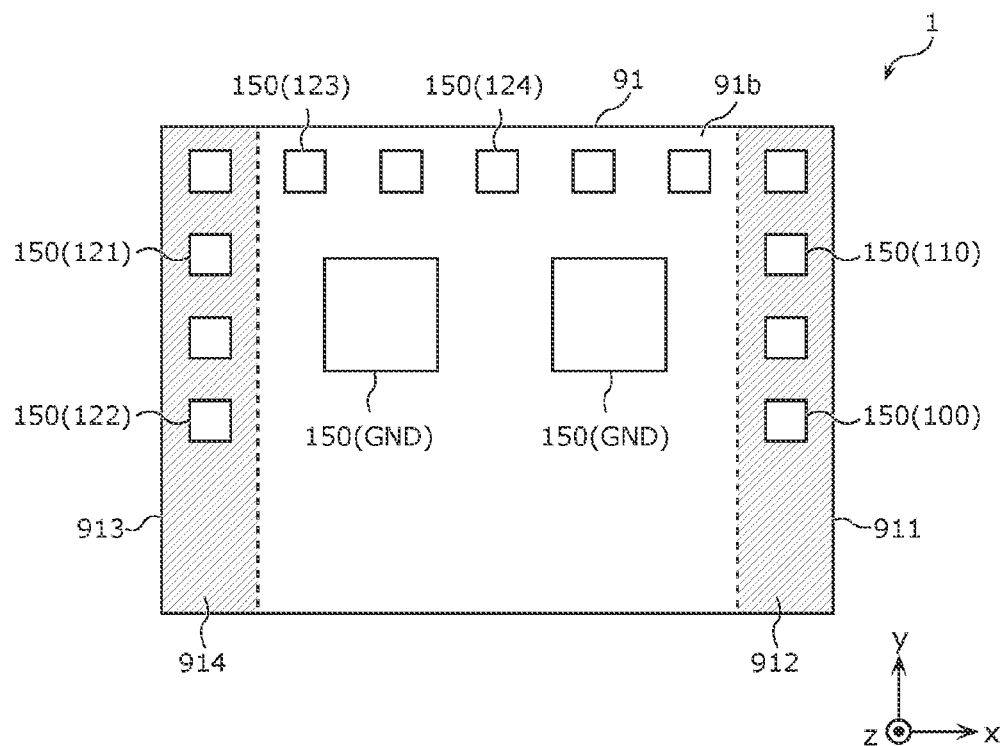
FIG. 2B is a plan view of the RF module according to the embodiment.
Figure 3:
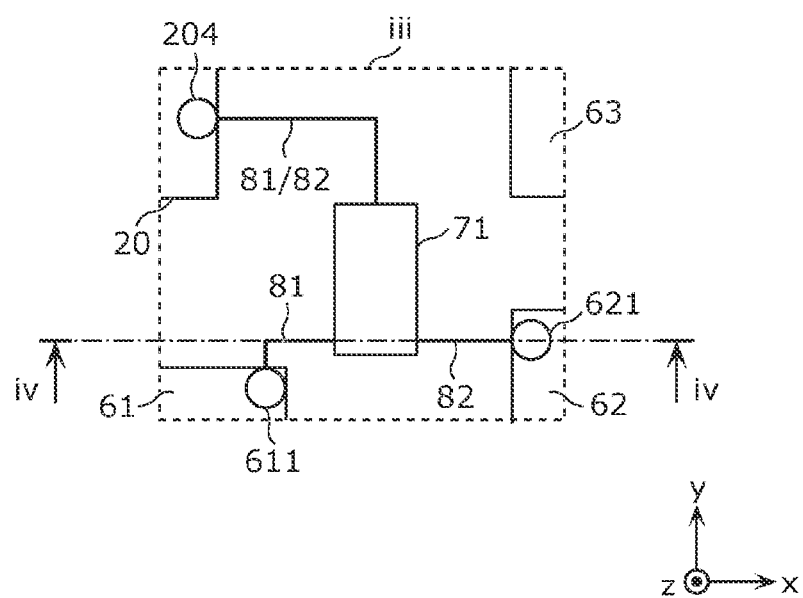
FIG. 3 is an enlarged plan view of the RF module according to the embodiment.
Figure 4:
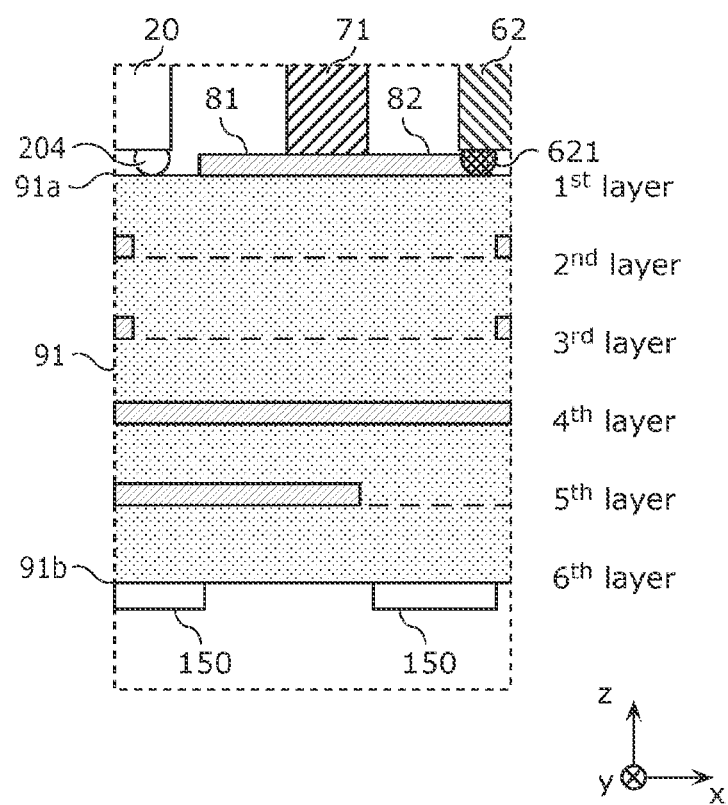
FIG. 4 is an enlarged plan view of the RF module according to the embodiment.

FIGS. 2A and 2B are plan views of the RF module 1 according to the embodiment. Specifically, FIG. 2A illustrates a view of a main surface 91a of a module substrate 91 from the z-axis positive side. FIG. 2B illustrates a view of a main surface 91b of the module substrate 91 from the z-axis positive side. FIG. 3 is an enlarged plan view of the RF module 1 according to the embodiment. Specifically, FIG. 3 is an enlarged view of a region iii in FIG. 2A. FIG. 4 is an enlarged plan view of the RF module 1 according to the embodiment. The cross section of the RF module 1 in FIG. 4 is a cross section taken along line iv-iv of FIG. 3.

As illustrated in FIGS. 2A and 2B, the RF module 1 further includes, in addition to circuit components forming the circuit illustrated in FIG. 1, the module substrate 91 and external connection terminals 150.

The module substrate 91 has the main surface 91a and the main surface 91b facing each other. Examples of the module substrate 91 include a low-temperature co-fired ceramics substrate (LTCC), a high-temperature co-fired ceramics substrate (HTCC), a component built-in substrate, a substrate with a redistribution layer (RDL), and a printed circuit board, having a multilayer structure of multiple dielectric layers, but these are not the only possible types of substrate.

The main surface 91a is an example of a first main surface, and may be called an upper surface or a surface. As illustrated in FIG. 2A, the low noise amplifiers 21 to 24, the switches 51 and 52, the filters 61 to 64, and the matching circuits 71 to 73 are arranged on the main surface 91a.

The low noise amplifiers 21 to 24 and the switches 51 and 52 are built into a semiconductor integrated circuit (IC) 20 having an outline that is rectangular in plan view. The semiconductor IC 20 is an electronic circuit formed on the surface of and inside a semiconductor chip (may also be called a die), and the semiconductor IC 20 may also be called a semiconductor component. The semiconductor IC 20 is formed of, for example, CMOS (Complementary Metal Oxide Semiconductor), and specifically may be formed by an SOI (Silicon on Insulator) process. Accordingly, the semiconductor IC 20 can be manufactured at low cost. Note that the semiconductor IC 20 may be formed of at least one of GaAs, SiGe, and GaN. Accordingly, the high-quality semiconductor IC 20 can be realized.

The semiconductor IC 20 has terminals 201 to 206 in the vicinity of outer edges of the semiconductor IC 20 in plan view. As the terminals 201 to 206, for example, electrode pads, bump electrodes, or lead electrodes can be used, but these are not the only possible types of electrodes that can be used as the terminals 201 to 206.

The terminal 201 is an example of a first terminal, is connected to the antenna connection terminal 100, and is connected to the terminal 511 of the switch 51 in the semiconductor IC 20. The terminal 202 is connected by a wire 84 to the matching circuit 73 and the input/output terminal 641 of the filter 64. In addition, the terminal 202 is connected to the terminal 514 of the switch 51 in the semiconductor IC 20. The terminal 203 is connected by a wire 83 to the matching circuit 72 and the input terminal 631 of the filter 63. Moreover, the terminal 203 is connected to the terminal 513 of the switch 51 in the semiconductor IC 20. The terminal 204 is connected by wires 81 and 82 to the matching circuit 71, the input terminal 621 of the filter 62, and the input terminal 611 of the filter 61. In addition, the terminal 204 is connected to the terminal 512 of the switch 51 in the semiconductor IC 20.

The terminals 201 to 204 are arranged in a region 212 (hatched region) of the semiconductor IC 20. The region 212 is an example of a third region, and is a virtual region extending along a side 211, which is one example of a third side, among four sides forming the rectangular outline of the semiconductor IC 20. Accordingly, the terminals 201 to 204 are arranged in the vicinity of the side 211.

The terminal 205 is an example of a second terminal, is connected to the RF output terminal 122, and is connected to the output of the low noise amplifier 22 in the semiconductor IC 20. The terminal 206 is an example of the second terminal, is connected to the RF output terminal 121, and is connected to the output of the low noise amplifier 21 in the semiconductor IC 20.

The terminals 205 and 206 are arranged in a region 214 of the semiconductor IC 20. The region 214 is an example of a fourth region and is a virtual region extending along a side 213, which is an example of a fourth side, among the four sides forming the rectangular outline of the semiconductor IC 20. The side 213 faces the side 211. Accordingly, the terminals 205 and 206 are arranged in the vicinity of the side 213 facing the side 211, and are arranged away from the terminals 201 to 204.

The wire 81 is an example of a second wire, and connects the terminal 204 of the semiconductor IC 20 and the filter 61. Specifically, as illustrated in FIGS. 2A and 3, the wire 81 connects the terminal 204 and the matching circuit 71, and connects the matching circuit 71 and the input terminal 611 of the filter 61.

The wire 82 is an example of the second wire, and connects the terminal 204 of the semiconductor IC 20 and the filter 62. Specifically, as illustrated in FIGS. 2A and 3, the wire 82 connects the terminal 204 and the matching circuit 71, and connects the matching circuit 71 and the input terminal 621 of the filter 62. The wires 81 and 82 connecting the terminal 204 and the matching circuit 71 are a common wire.

The wire 83 is an example of a third wire, and connects the terminal 203 of the semiconductor IC 20 and the filter 63. Specifically, as illustrated in FIG. 2A, the wire 83 connects the terminal 203 and the matching circuit 72, and connects the matching circuit 72 and the input terminal 631 of the filter 63.

The wire 84 is an example of a first wire, and connects the terminal 202 of the semiconductor IC 20 and the filter 64. Specifically, as illustrated in FIG. 2A, the wire 84 connects the terminal 202 and the matching circuit 73, and connects the matching circuit 73 and the input/output terminal 641 of the filter 64.

Planar pattern electrodes on the main surface 91*a* can be used as the wires 81 to 84, but these are not the only possible types of wires 81 to 84. For example, bonding wires may be used as some or all of the wires 81 to 84.

Here, the length of each of the wires 81, 82, and 84 is less than the length of the wire 83. That is, the wire between each of the filters 61, 62, and 64 for communication bands A, B, and D, which are allowed for simultaneous communication, and the switch 51 is shorter than the wire between the filter 63 for communication band C, which is not allowed for simultaneous communication, and the switch 51.

As illustrated in FIG. 4, immediately below the wires 81 and 82 and the matching circuit 71, pattern electrodes in second and third layers among multiple wiring layers in the module substrate 91 are removed. Here, the ordinal numbers of the wiring layers are assigned in ascending order from the main surface 91*a* side to the main surface 91*b* side. The first layer is a wiring layer on the main surface 91*a*. The second to fifth layers are wiring layers in the module substrate 91. The sixth layer is a wiring layer on the main surface 91*b*.

Note that the wiring layers from which pattern layers are removed are not limited to the second and third layers, but may be only the second layer, the second to fourth layers, or the second to fifth layers. That is, in plan view, in a region overlapping with at least one of the wires 81 and 82 and the matching circuit 71, no pattern electrode is arranged on the main surface 91*a* side of at least one of the wiring layers in the module substrate 91.

This can reduce the parasitic capacitance generated between the wires 81 and 82 bundling the filters 61 and 62 and the pattern electrodes in the module substrate 91. As a result, the impedance mismatching loss due to the parasitic capacitance of the filters 61 and 62 can be reduced in simultaneous communication of communication bands A and B, and the electrical characteristics of the RF module 1 can be improved.

Note that the total number of wiring layers in the module substrate 91 is not limited to six, and may be more or less than six.

The filters 61 to 64 are arranged in the vicinity of the side 211 of the semiconductor IC 20. The filter 63 is arranged between the filters 62 and 64. Acoustic wave filters using BAW (Bulk Acoustic Wave), LC filters, dielectric filters, and distribution constant type filters may be used as the filters 61 to 64, and furthermore, these are not the only possible types of filters used as the filters 61 to 64.

The main surface 91*b* is an example of a second main surface, and may be called a bottom surface or a back surface. As illustrated in FIG. 2B, the external connection terminals 150 are arranged on the main surface 91*b*.

The external connection terminals 150 include the antenna connection terminal 100, the RF input terminal 110, the RF output terminals 121 to 124, and ground terminals GND. The external connection terminals 150 are connected to input/output terminals and/or ground electrode or the like on a motherboard arranged in the z-axis negative direction of the RF module 1. Pad electrodes can be used as the external connection terminals 150, but this is not the only possible type of electrode used as the external connection terminals 150. For example, post electrodes or bump electrodes protruding from the main surface 91*b* may be used as the external connection terminals 150.

The RF input terminal 110, which is one of the external connection terminals 150, is arranged in a region 912 (hatched region) on the main surface 91*b*. The region 912 is an example of a first region, and is a virtual region extending along a side 911, which is one example of a first side, among four sides forming the rectangular outline of the module substrate 91. Accordingly, the RF input terminal 110 is arranged in the vicinity of the side 911.

The RF output terminals 121 and 122, each of which is one of the external connection terminals 150, are arranged in a region 914 (hatched region) on the main surface 91*b*. The region 914 is an example of a second region, and is a virtual region extending along a side 913, which is an example of a second side, among the four sides forming the external outline of the module substrate 91. Accordingly, the RF output terminals 121 and 122 are arranged in the vicinity of the side 913 facing the side 911, and are arranged away from the RF input terminal 110.

The ground terminals GND are arranged between the RF input terminal 110 and each of the RF output terminals 121 and 122. In FIG. 2B, two ground terminals GND, which are larger than the other RF input terminal 110, are arranged in a central region on the main surface 91*b*, positioned between the regions 912 and 914.

[1.3 Effects]

As described above, the RF module 1 according to the present embodiment includes: the module substrate 91 having the main surfaces 91*a* and 91*b* facing each other and having an outline that is rectangular in plan view; the external connection terminals 150 arranged on the main surface 91*b* and including the RF input terminal 110 for receiving an amplified transmission signal from the outside, the RF output terminals 121 and 124 for supplying a reception signal to the outside, and the antenna connection terminal 100; the filter 64 arranged on the main surface 91*a*, connected between the RF input terminal 110/the RF output terminal 124 and the antenna connection terminal 100, and having a passband including communication band D for TDD; and the filter 61 arranged on the main surface 91*a*, connected between the RF output terminal 121 and the antenna connection terminal 100, and having a passband including at least part of communication band A allowed for simultaneous communication with communication band D. The RF input terminal 110 is arranged in the region 912 on the main surface 91*b*, extending along the side 911 among the four sides forming the rectangular outline of the module substrate 91. The RF output terminal 121 is arranged in the region 914 on the main surface 91*b*, extending along the side 913 facing the side 911, among the four sides forming the rectangular outline of the module substrate 91.

Accordingly, the RF input terminal 110, to which an amplified transmission signal in communication band D is input, can be arranged in the vicinity of the side 911 of the module substrate 91, and the RF output terminal 121, from which a reception signal in communication band A allowed for simultaneous communication with communication band D is output, can be arranged in the vicinity of the side 913 facing the side 911 of the module substrate 91. Therefore, the distance between the RF input terminal 110 and the RF output terminal 121 can be increased on the main surface 91b of the module substrate 91, thereby improving the isolation of the RF input terminal 110 and the RF output terminal 121. As a result, in the case where simultaneous communication is performed in communication bands A and D, the interference between an amplified transmission signal flowing through the RF input terminal 110 and a reception signal flowing through the RF output terminal 121 can be suppressed, thereby improving the reception sensitivity. In particular, in the present embodiment, since an amplified transmission signal flows through the RF input terminal 110, the improvement in the reception sensitivity due to the suppression of the interference between a transmission signal and a reception signal is remarkable.

Moreover, for example, in the RF module 1 according to the present embodiment, the external connection terminals 150 may further include the ground terminal GND arranged between the RF input terminal 110 and the RF output terminal 121.

Accordingly, since the ground terminal GND is arranged between the RF input terminal 110 and the RF output terminal 121, the interference between an amplified transmission signal flowing through the RF input terminal 110 and a reception signal flowing through the RF output terminal 121 can be further suppressed.

Furthermore, for example, the RF module 1 according to the present embodiment may further include the semiconductor IC 20 arranged on the main surface 91a or 91b and having an outline that is rectangular in plan view. The semiconductor IC 20 includes: the switch 51 connected between the antenna connection terminal 100 and the filters 61 and 64; the low noise amplifier 21 connected between the filter 61 and the RF output terminal 121; the terminal 201 connected to the antenna connection terminal 100 and connected to the switch 51 in the semiconductor IC 20; and the terminal 206 connected to the RF output terminal 121 and connected to the output of the low noise amplifier 21 in the semiconductor IC 20. The terminal 201 may be arranged in the region 212 extending along the side 211 among the four sides forming the rectangular outline of the semiconductor IC 20, and the terminal 206 may be arranged in the region 214 extending along the side 213 facing the side 211, among the four sides forming the rectangular outline of the semiconductor IC 20.

Accordingly, the terminal 201 through which a transmission signal in communication band D flows can be arranged in the vicinity of the side 211 of the semiconductor IC 20, and the terminal 206 through which a reception signal in communication band A flows can be arranged in the vicinity of the side 213 facing the side 211 of the semiconductor IC 20. Therefore, the distance between the terminals 201 and 206 can be increased in the semiconductor IC 20, thereby improving the isolation of the terminals 201 and 206. As a result, in the case where simultaneous communication is performed in communication bands A and D, the interference between an amplified transmission signal flowing through the terminal 201 and a reception signal flowing through the terminal 206 can be suppressed, thereby improving the reception sensitivity.

Meanwhile, for example, the RF module 1 according to the present embodiment may further include the filter 63 arranged on the main surface 91a, connected between the RF output terminal 123 for supplying a reception signal to the outside and the antenna connection terminal 100, and having a passband including at least part of communication band C not allowed for simultaneous communication with communication band D. Each of the wire 84 connecting the filter 64 and the switch 51 and the wire 81 connecting the filter 61 and the switch 51 may be shorter than the wire 83 connecting the filter 63 and the switch 51.

Accordingly, the length of the wires 81 and 84 between the filter 61/the filter 64 and the switch 51 used in simultaneous communication can be reduced. Therefore, the wiring loss and mismatching loss due to the wires 81 and 84 can be reduced, and the electrical characteristics (such as noise figure (NF)) of the RF module 1 in simultaneous communication can be improved.

Moreover, for example, the RF module 1 according to the present embodiment may further include a conductive component arranged between the filter 61 and the filter 64.

Accordingly, a conductive component may be arranged between the filter 61 through which a reception signal in communication band A flows and the filter 64 through which a transmission signal and a reception signal in communication band D flow. Therefore, the isolation of the filters 61 and 64 can be improved, and the interference between a transmission signal in communication band D and a reception signal in communication band A can be suppressed, thereby improving the reception sensitivity.

Furthermore, for example, in the RF module 1 according to the present embodiment, the conductive component may include the filter 63, which is connected between the RF output terminal 123 for supplying a reception signal to the outside and the antenna connection terminal 100, and which has a passband including at least part of communication band C not allowed for simultaneous communication with communication band D.

Accordingly, the filter 63 passing a reception signal in communication band C not allowed for simultaneous communication with communication band A can be used as a conductive component arranged between the filter 61 and the filter 64.

In addition, for example, in the RF module 1 according to the present embodiment, communication band D may be Band 41 for LTE or n41 for 5GNR.

Accordingly, Band 41 or n41 can be used as communication band D.

Moreover, for example, in the RF module 1 according to the present embodiment, communication band A may be Band 1 or Band 3 for LTE or n75 or n76 for 5GNR.

Accordingly, Band 1, Band 3, n75, or n76 can be used as communication band A.

Furthermore, for example, in the RF module 1 according to the present embodiment, communication band C may be Band 7 or Band 40 for LTE.

Accordingly, Band 7 or Band 40 can be used as communication band C.

The communication device 5 according to the present embodiment includes the RFIC 3 processing an RF signal and the RF module 1 transmitting an RF signal between the RFIC 3 and the antenna 2.

Accordingly, the communication device 5 can achieve effects that are the same as or similar to those of the RF module 1.

Other Embodiments

As described above, although the RF module and the communication device according to the present disclosure have been described based on the embodiment, the RF module and the communication device according to the present disclosure are not limited to the above embodiment.

Another embodiment realized by combining any components in the above embodiment, a modification obtained by applying various modifications conceivable to those skilled in the art to the above embodiment without necessarily departing from the gist of the present disclosure, and various devices with the built-in RF module and communication device are also included in the present disclosure.

For example, in the circuit configuration of the RF module and the communication device according to the above embodiment, another circuit element and wire may be inserted in a path connecting the circuit elements and signal paths illustrated in the drawings. For example, in the above embodiment, a filter may be inserted between the antenna connection terminal 100 and the switch 51. Alternatively, for example, matching circuits may be inserted between the filters 61 to 64 and the low noise amplifiers 21 to 24.

Although the filter 63 is arranged between the filters 61 and 62 and the filter 64 in the above embodiment, the filter 63 is not the only possible component arranged between the filters 61 and 62 and the filter 64. For example, the matching circuit 73, a control circuit (not illustrated), a power supply circuit (not illustrated), or a metal wall may be arranged between at least one of the filters 61 and 62 and the filter 64. That is, another conductive component may be arranged between the filters 61 and 62 and the filter 64. In addition, no conductive component may be arranged between the filters 61 and 62 and the filter 64.

Note that, although the main surfaces 91*a* and 91*b* of the module substrate 91 are not molded with a resin member in the above embodiment, this is not the only possible case. That is, the main surfaces 91*a* and/or 91*b* of the module substrate 91 may be molded with a resin member. In this case, the surface of the resin member may be covered with a shield electrode layer.

Note that, although the ground terminals GND are arranged between the RF input terminal 110 and the RF output terminals 121/122 in the above embodiment, this is not the only possible case. That is, no ground terminal GND may be arranged between the RF input terminal 110 and the RF output terminals 121/122.

Note that, although the low noise amplifiers 21 to 24 and the switches 51 and 52 are built into the single semiconductor IC 20 in the above embodiment, this is not the only possible case. For example, neither low noise amplifier nor switch may be provided. Each of the low noise amplifiers 21 to 24 and the switches 51 and 52 may be a separate surface mount device. In addition, the low noise amplifiers 21 to 24 and the switches 51 and 52 may be built in any combination into multiple semiconductor ICs.

Note that, although the semiconductor IC 20 is arranged on the main surface 91*a* of the module substrate 91 in the above embodiment, the semiconductor IC 20 may be arranged on the main surface 91*b*.

Note that, although each of the wires 81, 82, and 84 is shorter than the wire 83 in the above embodiment, this is not the only possible case. For example, at least one of the wires 81, 82, and 84 may be longer than the wire 83.

INDUSTRIAL APPLICABILITY

The present disclosure can be widely used as an RF module arranged in a front-end portion in communication devices such as mobile phones.

REFERENCE SIGNS LIST

1 RF module
2 antenna
3 RFIC
4 BBIC
5 communication device
20 semiconductor IC
21, 22, 23, and 24 low noise amplifiers
51 and 52 switches
61, 62, 63, and 64 filters
71, 72, and 73 matching circuits
91 module substrate
91*a* and 91*b* main surfaces
100 antenna connection terminal
110 RF input terminal
121, 122, 123, and 124 RF output terminals
150 external connection terminals
201, 202, 203, 204, 205, 206, 511, 512, 513, 514, 521, 522, and 523 terminals
611, 621, and 631 input terminals
612, 622, and 632 output terminals
641 and 642 input/output terminals
911 and 913 sides
912 and 914 regions
GND ground terminals

The invention claimed is:

1. A radio frequency module comprising:
a module substrate comprising a first main surface and a second main surface facing each other and comprising a first outline that is rectangular in plan view;
a plurality of external connection terminals arranged on the second main surface and including a radio frequency input terminal configured to receive an amplified transmission signal, a first radio frequency output terminal and a second radio frequency output terminal configured to supply a first reception signal, and an antenna connection terminal;
a first filter arranged on the first main surface, the first filter connected between the radio frequency input terminal/the first radio frequency output terminal and the antenna connection terminal, and the first filter comprising a passband including a first communication band for time division duplex (TDD); and
a second filter arranged on the first main surface, the second filter connected between the second radio frequency output terminal and the antenna connection terminal, and the second filter comprising a passband including at least part of a second communication band allowed for simultaneous communication with the first communication band, wherein:
the radio frequency input terminal is arranged in a first region on the second main surface, the radio frequency input terminal extending along a first side, the first side being among four sides that form the first outline of the module substrate, and
the second radio frequency output terminal is arranged in a second region on the second main surface, the second radio frequency output terminal extending along a second side facing the first side, the second side being among the four sides that form the first outline of the module substrate.

2. The radio frequency module according to claim 1, wherein the plurality of external connection terminals further comprise a ground terminal that is arranged between the radio frequency input terminal and the second radio frequency output terminal.

3. The radio frequency module according to claim 2, further comprising:
a semiconductor integrated circuit arranged on the first main surface or the second main surface, the semiconductor integrated circuit comprising a second outline that is rectangular in plan view, the semiconductor integrated circuit comprising:
a switch connected between the antenna connection terminal and the first filter/the second filter;
a low noise amplifier connected between the second filter and the second radio frequency output terminal;
a first terminal connected to the antenna connection terminal and connected to the switch in the semiconductor integrated circuit; and
a second terminal connected to the second radio frequency output terminal and connected to an output of the low noise amplifier in the semiconductor integrated circuit, wherein
the first terminal is arranged in a third region extending along a third side, the third side being among four sides that form the second outline of the semiconductor integrated circuit, and
the second terminal is arranged in a fourth region extending along a fourth side facing the third side, the fourth side being among the four sides that form the second outline of the semiconductor integrated circuit.

4. The radio frequency module according to claim 2, further comprising a conductive component arranged between the first filter and the second filter.

5. The radio frequency module according to claim 2, wherein the first communication band comprises Band 41 for Long Term Evolution (LTE) or n41 for 5th Generation New Radio (5GNR).

6. The radio frequency module according to claim 2, wherein the second communication band comprises Band 1 or Band 3 for Long Term Evolution (LTE), or n75 or n76 for 5th Generation New Radio (5GNR).

7. The radio frequency module according to claim 1, further comprising:
a semiconductor integrated circuit arranged on the first main surface or the second main surface, the semiconductor integrated circuit comprising a second outline that is rectangular in plan view,
the semiconductor integrated circuit comprising:
a switch connected between the antenna connection terminal and the first filter/the second filter;
a low noise amplifier connected between the second filter and the second radio frequency output terminal;
a first terminal connected to the antenna connection terminal and connected to the switch in the semiconductor integrated circuit; and
a second terminal connected to the second radio frequency output terminal and connected to an output of the low noise amplifier in the semiconductor integrated circuit, wherein
the first terminal is arranged in a third region extending along a third side, the third side being among four sides that form the second outline of the semiconductor integrated circuit, and
the second terminal is arranged in a fourth region extending along a fourth side facing the third side, the fourth side being among the four sides that form the second outline of the semiconductor integrated circuit.

8. The radio frequency module according to claim 7, further comprising:
a third filter arranged on the first main surface, the third filter connected between a third radio frequency output terminal configured to supply a second reception signal to the antenna connection terminal, and the third filter comprising a passband including at least part of a third communication band that is excluded for simultaneous communication with the first communication band,
wherein a first wire connecting the first filter and the switch, and a second wire connecting the second filter and the switch are each shorter than a third wire connecting the third filter and the switch.

9. The radio frequency module according to claim 8, wherein the third communication band comprises Band 7 or Band 40 for Long Term Evolution (LTE).

10. The radio frequency module according to claim 8, further comprising a conductive component arranged between the first filter and the second filter.

11. The radio frequency module according to claim 8, wherein the first communication band comprises Band 41 for Long Term Evolution (LTE) or n41 for 5th Generation New Radio (5GNR).

12. The radio frequency module according to claim 7, further comprising a conductive component arranged between the first filter and the second filter.

13. The radio frequency module according to claim 7, wherein the first communication band comprises Band 41 for Long Term Evolution (LTE) or n41 for 5th Generation New Radio (5GNR).

14. The radio frequency module according to claim 1, further comprising a conductive component arranged between the first filter and the second filter.

15. The radio frequency module according to claim 14, wherein the conductive component comprises a third filter connected between a third radio frequency output terminal configured to supply a second reception signal to the antenna connection terminal, and the third filter comprising a passband including at least part of a third communication band that is excluded for simultaneous communication with the first communication band.

16. The radio frequency module according to claim 15, wherein the first communication band comprises Band 41 for Long Term Evolution (LTE) or n41 for 5th Generation New Radio (5GNR).

17. The radio frequency module according to claim 14, wherein the first communication band comprises Band 41 for Long Term Evolution (LTE) or n41 for 5th Generation New Radio (5GNR).

18. The radio frequency module according to claim 1, wherein the first communication band comprises Band 41 for Long Term Evolution (LTE) or n41 for 5th Generation New Radio (5GNR).

19. The radio frequency module according to claim 1, wherein the second communication band comprises Band 1 or Band 3 for Long Term Evolution (LTE), or n75 or n76 for 5th Generation New Radio (5GNR).

20. A communication device comprising:
a signal processing circuit that is configured to process a radio frequency signal; and
a radio frequency module according to claim 1, the radio frequency module configured to transmit the radio frequency signal between the signal processing circuit and an antenna.

* * * * *